United States Patent Office 3,531,263
Patented Sept. 29, 1970

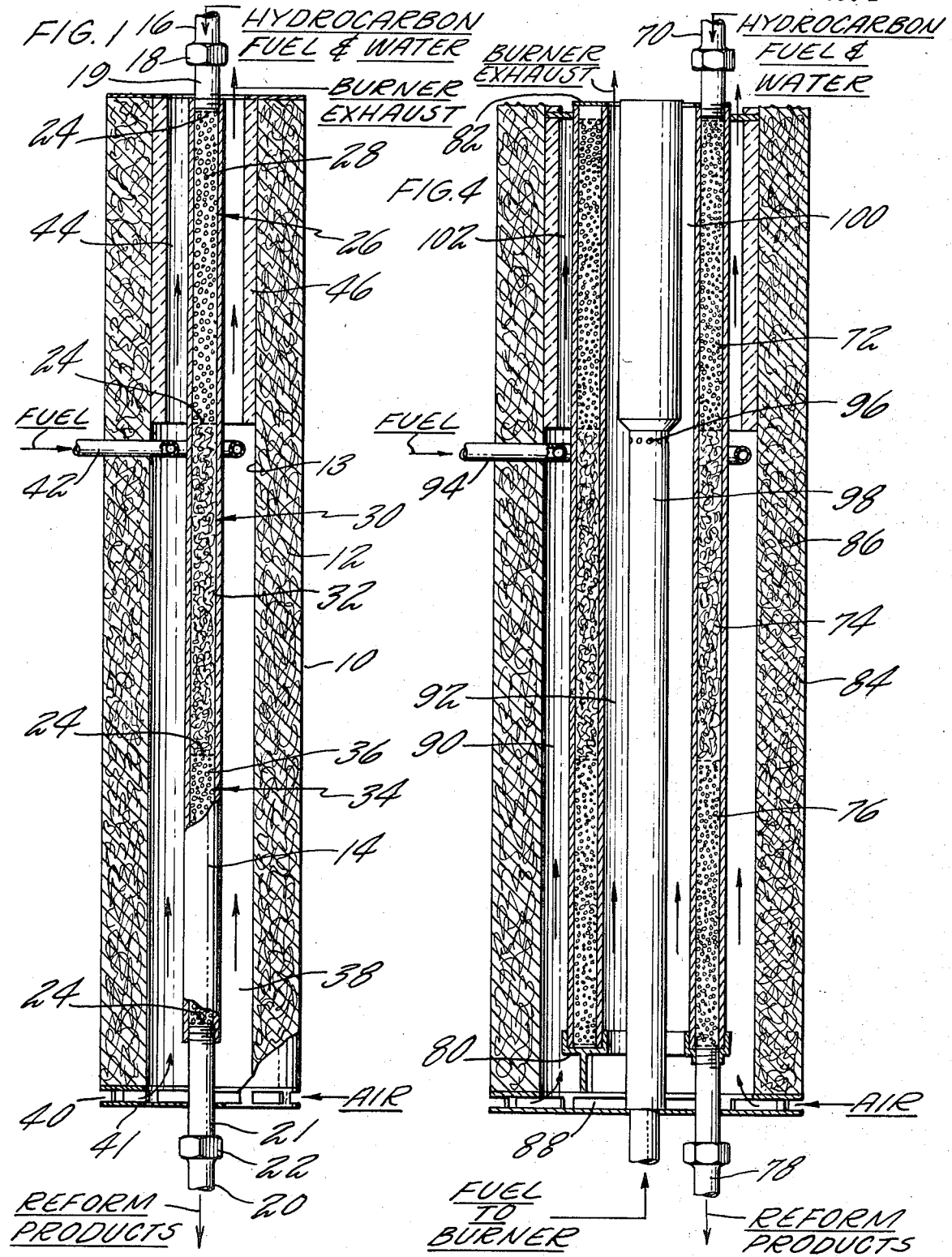

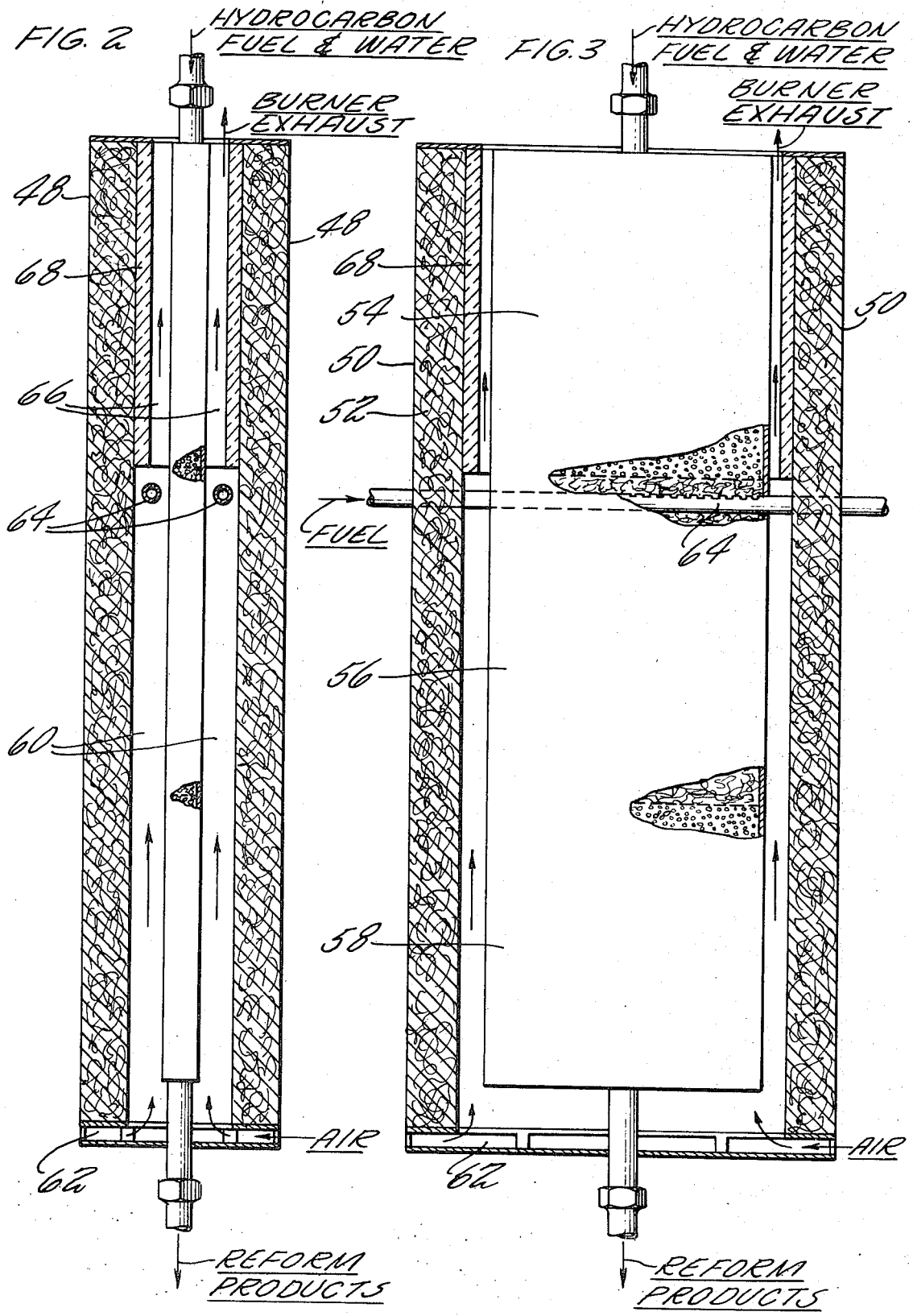

3,531,263
INTEGRATED REFORMER UNIT
Richard A. Sederquist, Newington, Conn., assignor to United Aircraft Corporation, East Hartford, Conn., a corporation of Delaware
Filed Aug. 5, 1968, Ser. No. 750,333
Int. Cl. C01b 1/13; B01j 7/00
U.S. Cl. 48—61           10 Claims

ABSTRACT OF THE DISCLOSURE

The apparatus is comprised of a simple can type of structure which houses the major reaction components of a system for converting hydrocarbon feedstocks, wherein the feedstock passes through a reactor cavity and the hydrocarbon fuel stream reacts to produce a hydrogen-rich stream. The converted stream passes through a products cooler which is in heat exchange relationship with an air stream to reduce the temperature of the reaction products. At a decreased temperature, the stream passes through a shift-conversion cavity where substantially all of the carbon monoxide in the stream is converted to carbon dioxide and hydrogen. The hydrogen-rich effluent leaves the fuel processing section and is directed to the operating fuel cell or other process equipment. Utilizing this inline concept, other process equipment can be easily added.

BACKGROUND OF THE INVENTION

Field of art

This invention relates to fuel processing units for use in fuel cell systems. In particular, this invention relates to an easily fabricated and filled, replaceable unit which combines many components of typical fuel processing systems into a single unit.

Description of the prior art

Conventional fuel processing systems associated with an operating fuel cell, package a boiler, a reactor, a burner, a shift-converter, and a number of heat exchangers into an overall assembly made up of interconnected separate components.

The development of fuel cells which can operate on impure hydrogen has stimulated research in the area of low pressure hydrogen generation. Emphasis has been placed upon catalytic conversion of hydrocarbon feedstocks into hydrogen and other constituents where the conversion takes place at relatively high temperatures, i.e., about 500° F. to 1500° F. Numerous systems mix hydrocarbon feedstock with steam and pass the mixture through a high temperature catalytic converter to produce hydrogen and carbon oxide products. Thereafter, the effluent stream from the converter, which contains significant amounts of carbon monoxide, is passed to a catalytic shift-converter operated at relatively low temperatures wherein the carbon monoxide is converted, in the presence of water vapor, to carbon dioxide and additional hydrogen. Heat management, component arrangement, ease of fabrication and replaceability, present problems in minimizing the size of such equipment and in obtaining a relatively high degree of thermal efficiency.

SUMMARY OF THE INVENTION

It is an object of this invention to provide a novel apparatus for the catalytic conversion of a hydrocarbon fuel into hydrogen having a relatively high degree of thermal efficiency and having a relatively compact construction.

Another object of the present invention is the provision of a mechanically simple, easily fabricated, and easily filled fuel processing unit which is relatively long-lived and may be replaced with a relative minimum of difficulty.

A further object of the present invention is the provision of a novel inline fuel processing insert which uniquely combines various elements of a fuel conversion system into one compact structure. Utilizing this inline concept, other process equipment can be added.

It has now been found that the foregoing and related objects and advantages may be readily attained in a novel fuel conversion apparatus. The apparatus has a fuel processing insert comprised of a primary reactor, a products cooler, and a shift-converter combined into a unique package which is easily fabricated, filled and is mechanically simple. A burner is provided about the reactor zone and the arrangement provides preheat of the burner air prior to combustion to minimize the amount of fuel required to provide the reactor heat.

In the operation of this apparatus, a mixture of a hydrocarbon fuel and water is passed through a boiler where it is heated to elevate the temperature. It then passes through a primary reactor containing a dehydrogenation catalyst where the reactor operates at an inlet temperature of about 500 to 600° F. to effect the conversion of substantially all the hydrocarbon in the stream to carbon oxide products and hydrogen. The stream from the primary reactor is passed from the primary reactor to a products cooler which is in heat exchange relation with a countercurrent flow of air to the burner. Passage of the stream through the products cooler establishes a thermal decline from the inlet to the outlet of the cooler and decreases the temperature of the stream.

The stream, at a decreased temperature, passes through a bed of shift-conversion catalyst in the shift-reactor which has an outlet temperature of about 500 to 700° F. where the carbon monoxide in the stream is converted to carbon dioxide. Thereafter, the reform products are ducted to the fuel cell or other fuel process equipment.

The fuel processing insert is contained within an outer casing. The space between the outer casing and the insert defines a burner air passage. Air passes countercurrently up through the passage between the insert and the outer casing and is heated before entering the burner section which surrounds the reactor.

BRIEF DESCRIPTION OF THE DRAWINGS

FIG. 1 is a sectional view of the fuel processing unit arranged as a tube.

FIG. 2 is a sectional view of an alternate fuel processing insert adapted to a folded can construction.

FIG. 3 is a side view of the folded can reformer exhibiting the component arrangement.

FIG. 4 is a more complex embodiment of the invention in a cylindrical construction.

DESCRIPTION OF THE PREFERRED EMBODIMENT

Referring to FIG. 1, a fuel processing insert is shown in its simplest form as a tubular construction. The apparatus is composed of an outer casing 10 having a suitable tubular lining 12 of insulating material disposed therein. Within the outer casing 10 and inside of and spaced from the inner wall of the lining is a tubular unit 14 housing the basic components of a fuel processing system. The tubular unit 14 is disengageably attached to a hydrocarbon fuel and water supply conduit 16 by coupling 18. At the opposite end of the tubular unit 14, the unit is connected to a supply line 20 by connector 22. Axially spaced porous separators 24 within the tube 14 define three cavities within the tubular unit 14. These separators may be, for example, stainless steel screens.

The uppermost or reactor cavity 26 contains a dehydrogenation catalyst 28 in particle form. The dehydrogenation catalyst 28 includes granular catalysts such as powders, compacts, sinters, and other discrete masses. The center or products cooler cavity 30 contains a heat transfer packing 32. The heat transfer packing may be steel-shot, conductive metal fibers or a similar material which will facilitate heat transfer from the process flow to the outer walls of the tube. The lower or shift conversion cavity 34 contains a shift conversion catalyst 36 in particle form similar to that in the reaction cavity 26. The separators are so constructed as to retain the particles in the respective cavities.

Air enters the annular passage 38 defined between the inner tube 14 and the inner surface of wall 12 through circumferentially spaced openings 40 in the periphery of a base member 41 on which the device is supported. Natural or forced draft air passes upward through passages 38 past a fuel manifold 42 in that passage adjacent the upper end of the center cavity. Fuel injected into the airstream is burned in the passage 38 above the manifold designated as the burner section 44 of the passage. A ceramic burner lining 46 is shown on the inner surface of the insulating wall 12 in this area to improve heat transfer and minimize the heat losses during the burning process.

During operation of the unit, a mixture of hydrocarbon fuel and steam is passed to the reactor cavity 26 from conduit 16. Within the reactor cavity 26 the hydrocarbon fuel is steam-reformed in the presence of the dehydrogenation catalyst 28. Suitable dehydrogenation catalysts are commercially available. One such catalyst is a proprietary nickel catalyst designated G–56, and may be obtained from the Girdler Catalyst Company. The temperature in the reactor cavity may vary from 300° F. at the inlet to 1800° F. at the outlet, although the preferred range should be between 500° F. and 1500° F. Since the reforming reaction is endothermic, heat for the reaction is supplied by combustion in the burner 44. The reformed gas leaving the reactor is generally composed of hydrogen, carbon dioxide, carbon monoxide, water vapor, and residual methane and nitrogen.

In this apparatus, careful attention is given to the overall heat balance and heat requirements of the hydrogen generating reaction since the economy of heat utilization is essential to reasonable hydrogen cost and reasonable efficiency. Complex heat exchangers and condensers have been eliminated by the substitution of a simple straight tube to provide cooling of the reactor products. As the flow leaves the reactor cavity and enters the products cooler or heat exchange cavity 30, it gives up heat to the heat exchange or heat transfer packing or is forced outward toward the outer wall of this cavity so as to facilitate heat transfer to the countercurrent flow of air through the surrounding passage 38.

Typically, the flow from the reactor is subjected to a water gas shift reaction for the conversion of the carbon monoxide component of the flow to produce carbon dioxide and additional hydrogen. While the reactor is conventionally operated at temperatures of about 500° F. to 1500° F., the shift converter 34 is usually operated at a lower temperature, about 700 to 900° F. The shift reaction is exothermic. Provisions must be made to remove reaction heat in the shift converter to maintain the low temperature which tends to favor the conversion of carbon monoxide to hydrogen and carbon dioxide. Thus, it is apparent that the counter-flow of incoming air past the outer wall of the shift converter 34 maintains the temperature of the shift converter within the desired range. The catalyst in the shift reaction is typically an iron oxide catalyst and may be of the type provided by the Girdler Company such as G–66, G–66B, or G–3A.

The air to the burner flows countercurrent to the process flow within the tubular unit 14. Thus, as air flows up through passage 38, the air temperature increases prior to entering the burner. Since the unit is a straight tubular design, the airflow is shown as a natural draft flow enhanced by the heating of the air in its upward flow but the flow may be forced. It is obvious that the fuel required to provide the reactor heat is reduced by preheating the burner air. The burner air cools the shift converter and the products cooler. Thus, a dual purpose is provided by integrating the products cooler, shift converter, and air heater into a simple unit in a direct flow path.

The tubular unit 14 may be disconnected at the ends and removed from the outer casing 10. A replacement insert may be simply provided by inserting a second tube or by refilling and replacing the present unit. Filling is accomplished by opening the tube at the upper end as by removing the pipe section 19 and inserting in a proper sequence the separators, catalysts, and heat transfer packing. The ends of pipe sections 19 and 21 provide suitable stops to retain the screen and materials in the proper locations. Once the assembly is completed, the tubular insert may be connected to the fuel flow line.

From the above description, it will be seen that a simple efficient, and highly compact hydrogen processing system is provided by the present invention. This invention simplifies the fuel processing procedures and minimizes the mechanical parts and fabrication difficulties. The invention eliminates separate units with the attendant manifolding problems and plumbing difficulties. Futhermore, this apparatus combines many functions into a simple unit; an integrated inline apparatus which has relatively low temperatures at the support areas.

Referring to FIGS. 2 and 3, an alternate fuel processing construction is shown which is a folded-can construction exhibiting the component arrangement presented in the discussion of FIG. 1. The folded can apparatus is shown as having side walls 48 and end walls 50 lined with an insulating material 52, the inner surfaces of the latter defining the walls of a rectangular chamber. The apparatus is essentially a thin rectangle in shape so that the insert can be described as a flat unit within the outer casing. The insert has a top reactor section 54 containing a dehydrogenation catalyst and a central products cooler section 56 containing a heat transfer packing. The lower section is a shift-conversion unit 58. The insert is spaced from the inner surfaces of the insulating material 52 so that between the insert and the outer walls are parallel air passages 60 having air inlets 62 at the periphery of the base and open at the top for the discharge of the hot cooling air. Air passes up and around the insert such that air passages 60 essentially duct the air upward past a fuel manifold 64 located so that fuel can be injected just below the reactor section and burned in the burner portion 66 of the air passage surrounding the reactor. A burner lining 68 is also provided on the inner walls of the insulation within the outer casing. It is apparent that the inline insert approach has been incorporated into this apparatus so that the reactor, products cooler, and shift converter are combined into an integrated unit which is mechanically simple and easily inserted into and removed from the outer casing.

Referring now to FIG. 4, a more complex embodiment of the invention is shown and may be described as a cylindrical construction. In this embodiment, a mixture of hydrocarbon fuel and water enters the insert through conduit 70 and passes through an elongated annular reactor cavity 72. Thereafter the flow passes through the annular products cooler cavity 74 and through the annular shift-conversion cavity 76, these cavities being inline with one another. The products exit from the stem reforming insert through conduit 78. The insert has a bottom end cap 80 and top cover plate 82 to retain the reforming material within the cavities. In this apparatus, the outer wall 84 has a lining of insulation 86. Air enters at the base through inlets 88 and passes upward through the inner annular passages 90 and 92 surrounding and within the annulus of the insert. Fuel enters through line 94 and flows into the air passage 90 and enters through ports 96 in a center tube 98 to be burned in the passage 92. The center tube 98 serves to direct the flow of air in passage 92 in close relationship to the inner wall surfaces of the insert.

Each of these embodiments of the invention incorporates the inline assemblage of the reactor, products cooler, and shift converter, and the counterflow of air to the burner section surrounding the reactor. It is evident that the spacing and lengths of each of the components must be tailored to a specific application. Thus, the length of individual cavities in the insert as being one third of the total length is merely illustrative and not by way of limitation.

I claim:

1. An integrated apparatus for converting hydrocarbon feedstocks comprising:

an outer casing having an inner wall;

an insert containing, in sequence, a reactor cavity having a dehydrogenation catalyst therein for producing carbon oxide products and hydrogen from a hydrocarbon fuel and water feedstock, a products cooler cavity having a heat transfer packing in heat exchange relationship with an airstream, and a shift conversion cavity having a catalyst therein for converting carbon monoxide in the stream to carbon dioxide;

the insert being spaced from the inner wall to define an air passage, wherein the airflow is countercurrent to the flow within the insert; and a fuel nozzle in the air passage approximately at the reactor outlet such that the portion of the air passage around the reactor constitutes a burner portion.

2. An apparatus as in claim 1, wherein the insert is a refillable tube within and removable from the casing.

3. An apparatus as in claim 1, wherein the outer casing is cylindrical and the insert is a replaceable tube disposed within the outer casing.

4. An apparatus as in claim 3, wherein the reactor outlet temperature is about 1300 to 1500° F., and the reactor inlet temperature is about 500 to 600° F.

5. An apparatus as in claim 3, wherein stainless steel screens isolate and retain the catalytic materials and heat transfer packing in the respective cavities.

6. In combination with an apparatus for converting hydrocarbon feedstocks, the improvement which comprises:

a replaceable elongated insert containing in alignment therein, a reaction cavity having a dehydrogenation catalyst therein for producing carbon oxide products and hydrogen from a hydrocarbon fuel and water feedstock, a reactor products cooler cavity with means therein for heat exchange from the gaseous products in the cooler to the wall thereof, and a shift conversion cavity having a catalyst therein for converting carbon monoxide in the stream to carbon dioxide and inlet and discharge means at opposite ends of the insert for the flow of gaseous conversion products through the insert.

7. A claim as in claim 6, wherein the insert is removable and refillable with a fresh charge of catalytic materials and heat transfer packing.

8. A claim as in claim 6, wherein the dehydrogenation catalyst is nickel, and the heat transfer packing is stainless steel shot.

9. In the conversion of hydrogen feedstocks, the method of:

flowing a supply mixture of hydrocarbon fuel and steam linearly successively through a reactor, a heat transfer device, and a shift converter; and flowing, simultaneously, a heat transfer medium linearly in the opposite direction past these devices to accept heat from the shift converter and the heat transfer device and to supply a heated medium to a cavity surrounding the reactor.

10. The method of claim 9, including:

supplying additional heat to the heat transfer medium for providing a higher high input to the reactor.

References Cited

UNITED STATES PATENTS

| | | | |
|---|---|---|---|
| 3,251,652 | 5/1966 | Pfefferle | 23—212 X |
| 3,278,268 | 10/1966 | Pfefferle | 48—214 X |
| 3,350,176 | 10/1967 | Green et al. | 23—288 X |
| 3,469,944 | 9/1969 | Bocard et al. | 48—214 X |

MORRIS O. WOLK, Primary Examiner

R. E. SERWIN, Assistant Examiner

U.S. Cl. X.R.

23—212, 288; 48—196, 214; 252—373